June 3, 1941.　　　J. C. WELLS　　　2,244,227
OPHTHALMIC MOUNTING
Filed March 28, 1939
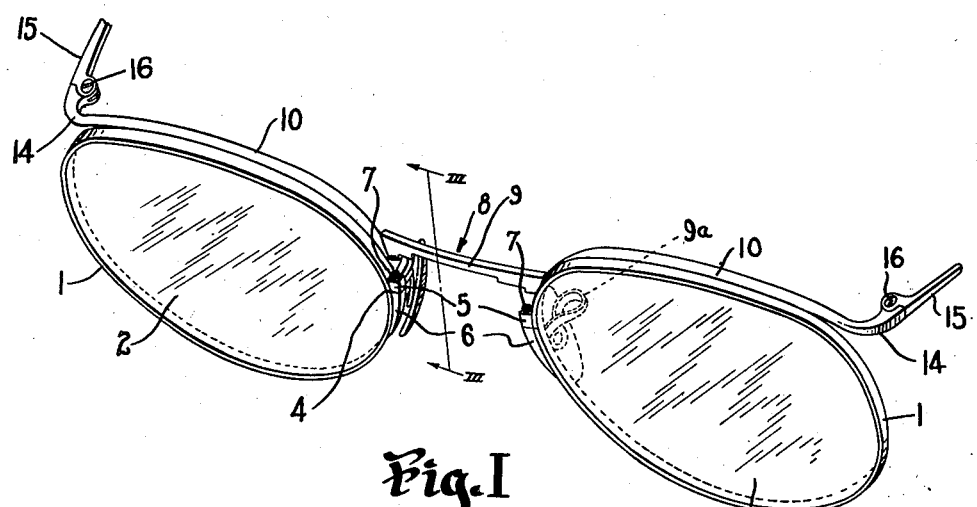
Fig. I
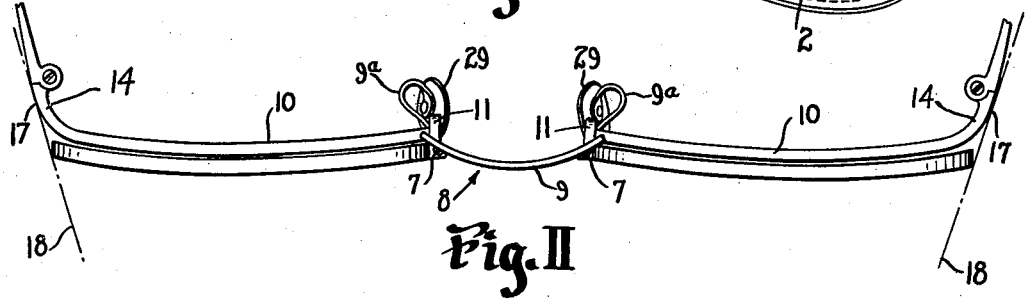
Fig. II
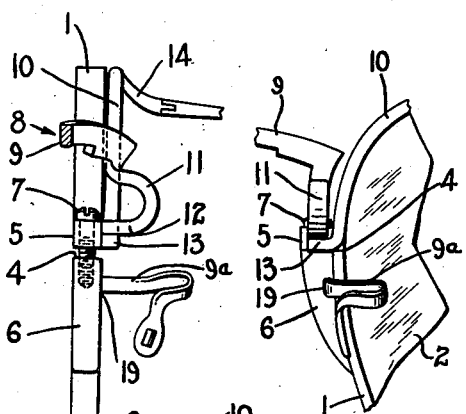
Fig. III　　Fig. IV
Fig. V
INVENTOR.
JOEL C. WELLS
BY Harry H. Styll
ATTORNEY.

Patented June 3, 1941

2,244,227

UNITED STATES PATENT OFFICE 2,244,227

OPHTHALMIC MOUNTING

Joel C. Wells, Southbridge, Mass., assignor to American Optical Company, Southbridge, Mass., a voluntary association of Massachusetts Application March 28, 1939, Serial No. 264,627

2 Claims. (Cl. 88—41)

This invention relates to improvements in ophthalmic mountings and has particular reference to a novel spectacle type mounting.

One of the principal objects of the invention is to provide a spectacle type mounting having lens rims fitting about the contour edges of the lenses with divided portions having connecting means adjacent the meeting ends thereof, and a supporting structure comprising bridge means for connecting said lens rims, and relatively long and slender temple supports shaped to substantially follow the upper contour shape of the lens rims and terminating in rearwardly extending temple connections.

Another important object of the invention is to provide a spectacle type mounting having channeled lens rims fitting about the contour edges of the lenses with divided portions having connecting means adjacent the meeting ends thereof and a supporting structure constituting bridge means for connecting said lens rims, adjustable nose pad supporting arms, and relatively long and slender temple supports shaped substantially to follow the upper contour shape of the lens rims and terminating in rearwardly extending temple connections, and more particularly to provide novel means whereby the parts may be located in desired positional relation with each other and yet allow adjustment to various different facial requirements.

Another object of the invention is to provide a mounting of the above character, having rim type lens supporting means divided for the admission of lenses therein, bridge means, nose pad supporting means, and relatively long and slender temple supports shaped substantially to follow the upper contour shape of the rims, all joined into integral relation with each other at a substantially common location of attachment, and means for securing the divided portions of the lens rims together.

Another object is to provide an ophthalmic mounting with lens supporting rims having relatively continuous unobstructed contour edges throughout the greater portion of the contour of the lenses, particularly on the temporal sides thereof, in combination with temple supporting portions located in the rear of the plane of the lenses so as to avoid having portions protruding from the lens rims in the plane of said lenses, and which provide a relatively wide range of adjustment for altering the distance between the temples and the angle of said temples relative to the plane of the lenses.

Another object is to provide novel means of making, assembling, and fitting ophthalmic mountings of the above character, whereby the relatively long and slender temple supports will be inconspicuous and substantially invisible when the mounting is in position of use on the face.

Other objects and advantages of the invention will become apparent from the following description taken in conjunction with the accompanying drawing, and it will be apparent that many changes in the details of construction and the arrangement of parts may be made without departing from the spirit of the invention as expressed in the accompanying claims. The preferred forms and arrangement of parts have been shown and described only by way of illustrations.

Referring to the drawing:

Fig. I is a perspective view of an ophthalmic mounting embodying the invention;

Fig. II is a top plan view of the mounting shown in Fig. I;

Fig. III is a slightly enlarged sectional view taken as on line III—III of Fig. I and looking in the direction of the arrows;

Fig. IV is a slightly enlarged fragmentary rear elevation showing the location of assemblage of the various parts of the mounting;

Fig. V is a fragmentary view generally similar to Fig. III, illustrating another modification wherein the bridge, temple supporting arms, and nose pad supporting arms are all joined in adjacent relation with each other and to one of the connecting lugs for joining the divided ends of the lens rims.

It is particularly desirable, in order to meet the requirements of different individuals, to provide an ophthalmic mounting having a wide range of adjustability, and which will be relatively inexpensive and practical from a manufacturing standpoint. It is also of utmost importance, while providing said adjustable and economical structure, to produce a mounting which will be desirable from the aesthetical viewpoint.

In most prior art constructions of ophthalmic mountings of the spectacle type having rim type lens holding means it has been usual to secure the temple supporting means to the lens rims adjacent the outer temporal sides thereof. Many of such temple supports had the appearance of a horn-like projection extending outwardly in the plane of the lenses, which not only had an unpleasant appearance but also produced protrusions at the sides of the face which were readily susceptible to being engaged with the danger of dislodging the mounting from the face and causing the lenses to become broken. Such construction of ophthalmic mountings also rendered it necessary to make several different solder connections at substantially spaced locations and made it necessary to perform said soldering operations separately of each other, and thereby greatly increased the cost of production of such mountings.

It, therefore, is one of the principal objects of the present invention to provide an ophthalmic mounting wherein most of the solder connections for joining the parts of the mounting are in close relation with each other, whereby some or all of said solder connections may be performed simultaneously and at the same time so arrange the various parts of the mountings whereby a wide range of adjustment of the various parts relative to each other is possible, and the undesirable horn-like projections or protrusions of most prior art constructions are dispensed with and a simple and pleasingly appearing mounting is formed. It is also an important object of the invention to provide a spectacle type construction of ophthalmic mounting whereby the lenses may be inserted in or removed from the lens rims without disturbing the other parts of the mounting.

Referring more particularly to the drawing wherein like characters of reference designate like parts throughout the several views, the mounting embodying the invention as illustrated in Figs. I to IV inclusive, comprises broadly a pair of lens rims which have a beveled inner groove for receiving the similarly beveled edges of the lenses 2.

The lens rims 1 are divided as illustrated at 4 and are provided, adjacent the divided ends thereof, with connecting lugs 5 and 6. One of the said lugs, preferably the lower lug 6, is so tapered as illustrated in Figs. I and IV as to blend substantially with the lens rim adjacent the lower end of the lug, and also to provide clearance at the sides of the nose. The said lugs 5 and 6 are held in aligned relation with each other by a connection screw or the like 7. The lugs in this particular instance are secured directly to the peripheral surfaces of the lens rims adjacent the nasal sides thereof, and provide means, in addition to their function of joining the meeting ends of the lens rims, to which the bridge member 8, nose pad supporting arms 9a, and relatively long and slender temple supports 10 may be secured.

In the construction illustrated in Figs. I to IV inclusive, the bridge member 8 is provided with a central arch portion 9 which is curved forwardly for clearance of the nose. The central arch portion 9 may be formed relatively rigid, ductile, or resilient, as desired, or may have portions thereof possessing one or more of said characteristics. The said bridge member is provided with rearwardly extending adjustable loop portions 11 and forwardly extending shank portions 12, secured to the rear of the lugs 5, or partially to the rear of said lugs and the rear of the lens rims as desired. The loop portions 11 provide means whereby the forwardly extending portions 12 may be adjusted sidewise to increase or decrease the distance between the lens rims, and also to provide means for adjusting the centrally arched portion upwardly and downwardly, or inwardly and outwardly as required. The relatively long and slender temple supports 10 are each provided with a deflected foot portion 13, which is also secured to the rear surface of the lug 5 and to the adjacent portion of the shank 12 of the bridge. The said shank portion 12 and foot 13 may be secured to the lug 5 or partially to said lug 5 and the adjacent portion of the lens rim by soft or hard soldering or welding as desired.

The relatively long and slender temple supports 10 may be formed of relatively rigid, ductile, or pliable material, or may be formed resilient or have different portions thereof possessing one or more of said characteristics. The said arms, adjacent the ends thereof, opposite the deflected foot 13 are provided with downwardly and rearwardly extending ends 14 to which the temples 15 are pivotally attached, as illustrated at 16. The temples 15 may be any of the known conventional type. The relatively long and slender temple supports 10, as illustrated in the drawings, are adapted to be shaped to follow substantially the upper contour shape of the lens rims in a plane in the rear of said lens rims with the upper surfaces thereof substantially flush with the surfaces of the adjacent portions of the lens rims. In use, therefore, the said relatively long supporting portions 10 will be located in the rear of the lens rims, and by being shaped substantially to the contour shape of said rims will be relatively inconspicuous or invisible when the mounting is viewed from the front. This type of temple support provides a wide range of adjustment whereby the distance between the temples 15 may be increased or decreased as desired, preferably by bending the portions 14 inwardly or outwardly, and may be located at different angular relations with respect to the plane of the lenses by bending the said portions 14 upwardly or downwardly.

It is particularly pointed out that with the above arrangement the rearwardly and downwardly extending portions 14 are located in a plane in the rear of the plane of the lens rims and do not protrude outwardly of said lens rims substantially in the plane thereof as has been usual with most prior art constructions of spectacle type mountings. It is also to be noted that the outer contour edges of the lens rims are relatively smooth and continuous and free from obstructions, so as to produce a pleasing, desirable appearance and to remove undesirable protrusions at the sides of the face and in the plane of the lenses, which might be accidentally engaged and through which the said mounting may be dislodged from the face. The outer surfaces 17 of the rearwardly extending portions 14 are substantially flush with the adjacent outer surfaces of the temples when the said temples are attached and are disposed in planes at relatively acute angles with respect to the edges of the lens rims, as illustrated by the dot and dash lines 18 in Fig. II. This clearly illustrates that there are no protrusions in the plane of the lenses.

In this particular instance the nose pad supporting arms 9a are secured as illustrated at 19, to the rear surface of the lugs 6 as by soldering, welding, or the like. It is to be noted, however, that the said arm 9a may, if desired, be secured to the lug 5 as illustrated in Fig. V. In this particular instance the shank 12, foot 13 and forward end of the arm 9a may be all held in desired assembled relation with each other and may be simultaneously joined with each other and with the lug 5 as by soldering, welding, or the like.

Following the usual procedure in the art, suitable nose pads 29 are pivotally attached to the nose pad supporting arms 9a.

It is also to be understood that although the relatively long and slender temple supports are specified as being preferably positioned in the rear of the plane of the lens rims, they may be located in or in front of the plane of said lens frames.

The temple supports 10, as shown in the drawing, terminate in rearwardly extending portions 14. The points on the peripheries of the lens rims 1 adjacent which the temple supports blend into their rearwardly extending portions 14 are, in the preferred structure, above the field of useful side vision. It is to be understood that the rearwardly extending portions 14 may be positioned adjacent any other desired points along the peripheries of the lens rims 1, with the temple supports 10 shaped to follow the contour shapes of the lens rims 1 until such points are reached.

From the foregoing description it will be seen that simple, efficient, and economical means have been provided for accomplishing all of the objects and advantages of the invention, particularly the provision of an ophthalmic mounting of the type having protection rims surrounding said lenses, in combination with a supporting structure, including a bridge member, relatively long and slender temple supports, and adjustable nose pad supporting arms which may be adjusted to the facial requirements of different individuals without disturbing the location of the lenses in the rims, and with which the lenses may be inserted in or removed from the lens rims without altering the relation of the adjustable supporting parts.

Having described my invention I claim:

1. A supporting structure for the lenses of an ophthalmic mounting comprising a pair of lens rims with uninterrupted substantially continuous outer surfaces on the temporal sides thereof adapted to be fitted about the contour edges of the lenses and having divided portions adjacent their nasal sides, each of the divided ends of said divided portions having perforated attachment lugs secured thereto, means extending within the perforations of said attachment lugs for connecting the same to secure the meeting ends together, bridge means having a central arch portion and depending side portions secured adjacent the terminal ends thereof to a rear surface only of one of said lugs adjacent one of the ends of said lug to support said rims in desired spaced aligned relation with each other and relatively long and slender temple supports shaped substantially to follow the upper contour shape in a plane in the rear of said rims and adjacent said rims, each of said long and slender temple supports having an end deflected outwardly in the plane of the long and slender temple support and having one of its side surfaces secured to the rear surface of the lug to which the end of the depending portion of the bridge is secured with said outwardly bent ends of the relatively long and slender temple supports lying adjacent the attached ends of the bridge and said long and slender temple supports having rearwardly extending temple attachment ends on the outer temporal sides of the rims.

2. A supporting structure for the lenses of an ophthalmic mounting comprising a pair of lens rims with uninterrupted substantially continuous outer surfaces on the temporal sides thereof adapted to be fitted about the contour edges of the lenses and having divided portions adjacent their nasal sides, each of the divided ends of said divided portions having perforated attachment lugs secured thereto, means extending within the perforations of said attachment lugs for connecting the same to secure the meeting ends together, bridge means having a central arch portion and depending side portions secured adjacent the terminal ends thereof to a rear surface only of one of said lugs adjacent one of the ends of said lug to support said rims in desired spaced aligned relation with each other and relatively long and slender temple supports shaped substantially to follow the upper contour shape in a plane in the rear of said rims and adjacent said rims, each of said long and slender temple supports having an end deflected outwardly in the plane of the long and slender temple support and having one of its side surfaces secured to the rear surface of the lug to which the end of the depending portion of the bridge is secured with said outwardly bent ends of the relatively long and slender temple supports lying adjacent the attached ends of the bridge and said long and slender temple supports having rearwardly extending temple attachment ends on the outer temporal sides of the rims and nose pad supporting arms having an end secured to the rear surface of each of the lugs to which the ends of the depending portions of the bridge and the outwardly bent ends of the relatively long and slender temple supports are secured with the said outwardly bent ends of the long and slender temple supports lying between the attached ends of the depending portions of the bridge and the attached ends of the nose pad supporting arms.

JOEL C. WELLS.